United States Patent
Durrant et al.

(10) Patent No.: US 7,104,701 B1
(45) Date of Patent: Sep. 12, 2006

(54) EXPANDED BEAM CONVERTER FOR MIL-PRF-83526/17 OPTICAL CONNECTOR

(75) Inventors: Richard C. E. Durrant, Algonquin, IL (US); Mark Krowiak, Oak Park, IL (US); Mark R. Waldron, Poplar Grove, IL (US)

(73) Assignee: Stratos International, Inc., Chicago, IL (US)

( * ) Notice: Subject to any disclaimer, the term of this patent is extended or adjusted under 35 U.S.C. 154(b) by 0 days.

(21) Appl. No.: 11/316,196

(22) Filed: Dec. 22, 2005

Related U.S. Application Data

(60) Provisional application No. 60/656,692, filed on Feb. 28, 2005.

(51) Int. Cl.
G02B 6/38 (2006.01)
G02B 6/26 (2006.01)
G02B 6/42 (2006.01)
G02B 6/32 (2006.01)
G02B 6/00 (2006.01)

(52) U.S. Cl. ............... 385/74; 385/31; 385/33; 385/136; 385/137; 385/138

(58) Field of Classification Search ............. 385/31, 385/33, 74, 136–138
See application file for complete search history.

(56) References Cited

U.S. PATENT DOCUMENTS

| 4,884,861 A | 12/1989 | Nodfelt ............ 350/96.18 |
| 5,247,595 A | 9/1993 | Foldi ............... 385/78 |
| 5,528,408 A | 6/1996 | McGinley et al. ...... 359/152 |
| 5,546,281 A | 8/1996 | Poplawski et al. ...... 361/752 |
| 6,234,683 B1 | 5/2001 | Waldron et al. ....... 385/78 |
| 6,350,063 B1 | 2/2002 | Gilliland et al. ...... 385/88 |
| 6,499,890 B1 | 12/2002 | Gilliland et al. ...... 385/88 |
| 6,913,402 B1 * | 7/2005 | Bohlin et al. ......... 385/93 |

OTHER PUBLICATIONS

U.S. Appl. No. 60/656,692, filed Feb. 28, 2005, Durrant et al.
Defense Logistics Agency, Proposed Revisions to MIL-PRF-29504/16, draft pp. 1-4, Sep. 15, 2005, Columbus, Ohio, and printed off of an internet web site at http://www.dscc.dla.mil/Downloads/MilSpec/Docs/MIL-PRF-29504/idprf29504ss16.pdf.
Defense Logistics Agency, Proposed New Specification Sheet MIL-PRF-83526/17, draft pp. 1-13, Sep. 14, 2004, Columbus, Ohio, and printed off of an internet web site at http://www.dscc.dla.mil/Downloads/MilSpec/Docs/MIL-C-83526/idprf83526ss17.pdf.
Fiber Systems International, Product Drawing "D" Receptacle 4 Channel Hermaphroditic TFOCA II, Aug. 26, 2002, Richardson, Texas, and printed off of an internet web site at http://www.fibersystems.com/products/drawings/FS4H8000_XY_4CH_D_MT_REC.pdf.

* cited by examiner

*Primary Examiner*—Frank G. Font
*Assistant Examiner*—Jerry Martin Blevins
(74) *Attorney, Agent, or Firm*—Karl D. Kovach

(57) ABSTRACT

The fiber optic connector includes a bulkhead connector housing, an expanded beam insert body, ferrules, ball lenses, focal length spacers, and a mating plane adapter. The expanded beam insert body is mounted to the bulkhead connector housing. The ferrules, ball lenses, and focal length spacers are mounted on the expanded beam insert body. The mating plane adapter is mountable to the bulkhead connector housing.

22 Claims, 5 Drawing Sheets

EXPANDED BEAM CONVERTER FOR MIL-PRF-83526/17 OPTICAL CONNECTOR

This non-provisional application claims the priority of the earlier filed U.S. Provisional Application Ser. No. 60/656,692, filed Feb. 28, 2005. U.S. Provisional Patent Application Ser. No. 60/656,692 is hereby incorporated herein by reference.

BACKGROUND OF THE INVENTION

1. Field of the Invention

The present invention pertains to fiber optic devices. The invention more particularly concerns a fiber optic connector converter.

2. Discussion of the Background

The TFOCA MIL-PRF-83526/17 is an accepted connector in use by the military. The current TFOCA MIL-PRF-83526/17 connector is a physical contact design. As a physical contact design, repeated mating can degrade performance. FIG. 1 and FIG. 2 display the current TFOCA MIL-PRF-83526/17 connector 10. The optical signal entering or exiting the any one of the ferrules 16, 17, 18, 19 can be blocked by a piece of debris placed in the axis of optical emission of the ferrule; thus causing system failure since the optical signal can not traverse the piece of debris.

SUMMARY OF THE INVENTION

It is an object of the invention to provide a fiber optic connector which utilizes a bulkhead connector housing that conforms to MIL-PRF-83526/17 (draft dated Sep. 14, 2004), but where the optics of the device utilize expanded beam technology.

The expanded beam technology is less sensitive to contamination as compared to physical contact connector technology. Therefore, the expanded beam fiber optic bulkhead connector is well suited for harsh environments.

The components of the expanded beam technology provide for the retro fitting of the existing, in the field, prior art bulkhead connectors that utilizes physical contact technology. The conversion incurs little added time or expense while providing improved operating characteristics.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PRESENTLY PREFERRED EMBODIMENT

Figure 3:
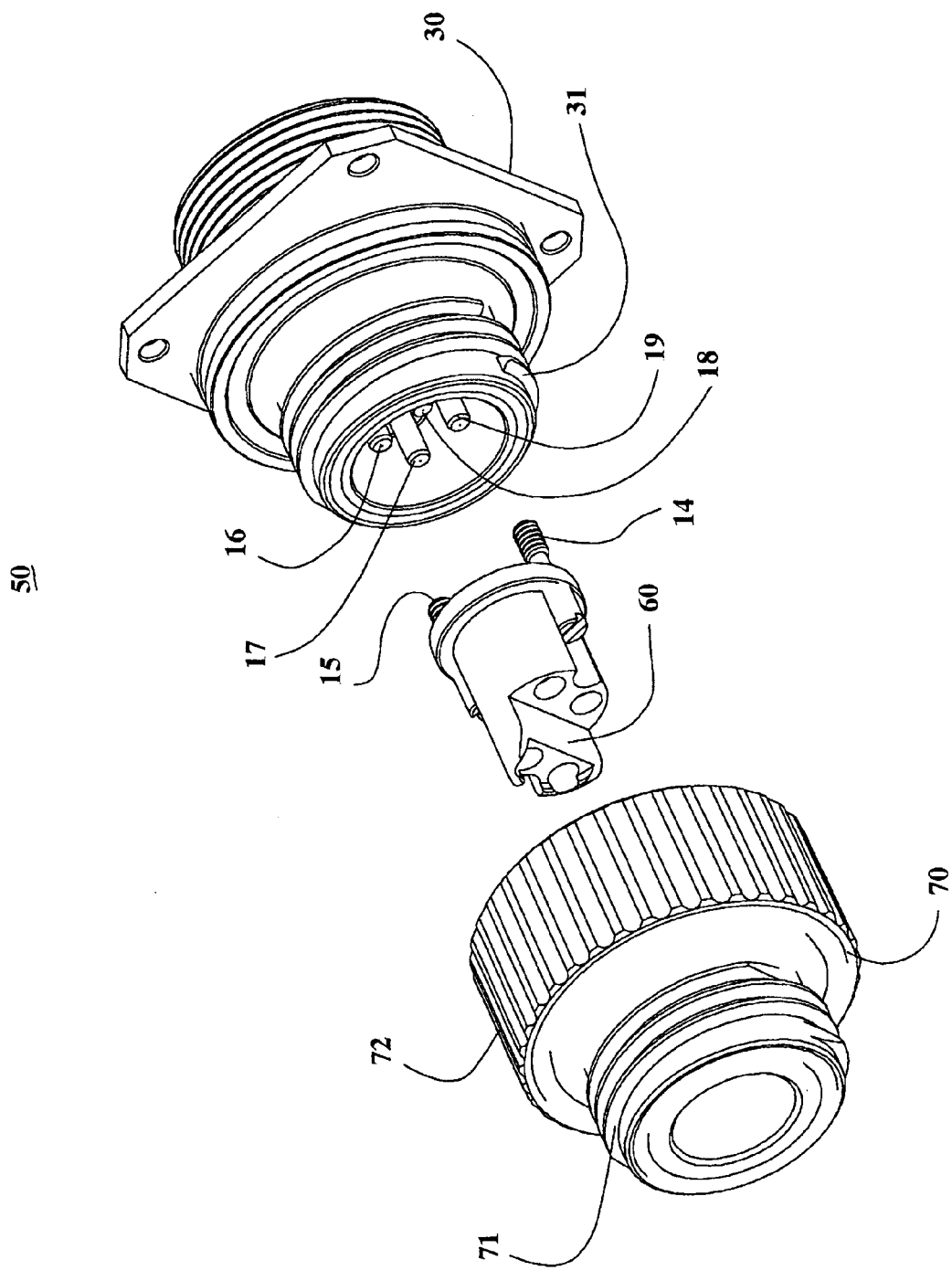
FIG. 3 is an exploded perspective view of the fiber optic bulkhead connector of the invention.
Figure 4:
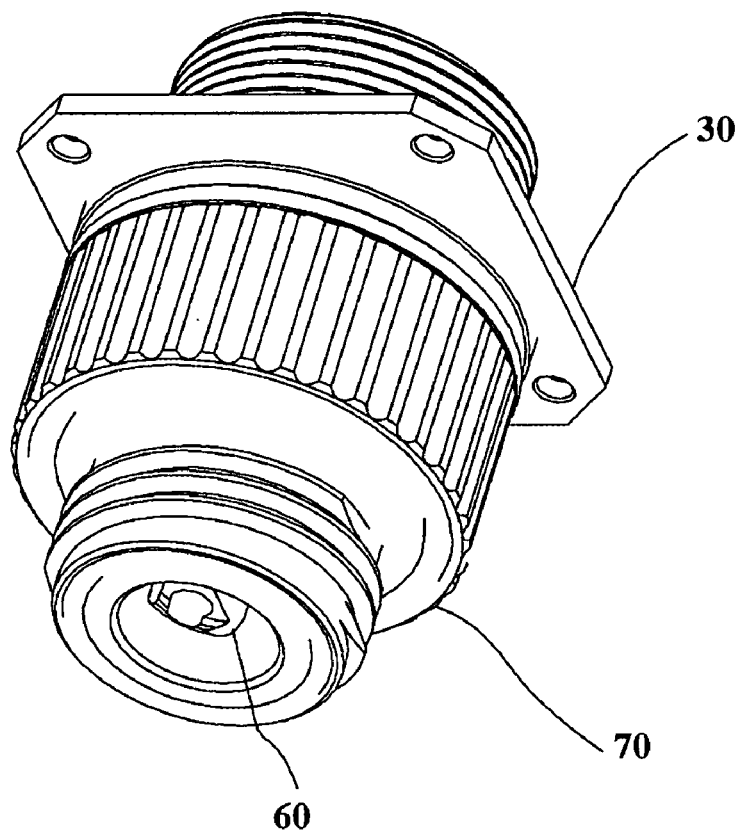
FIG. 4 is a perspective view of the fiber optic bulkhead connector of FIG. 3.
Figure 5:
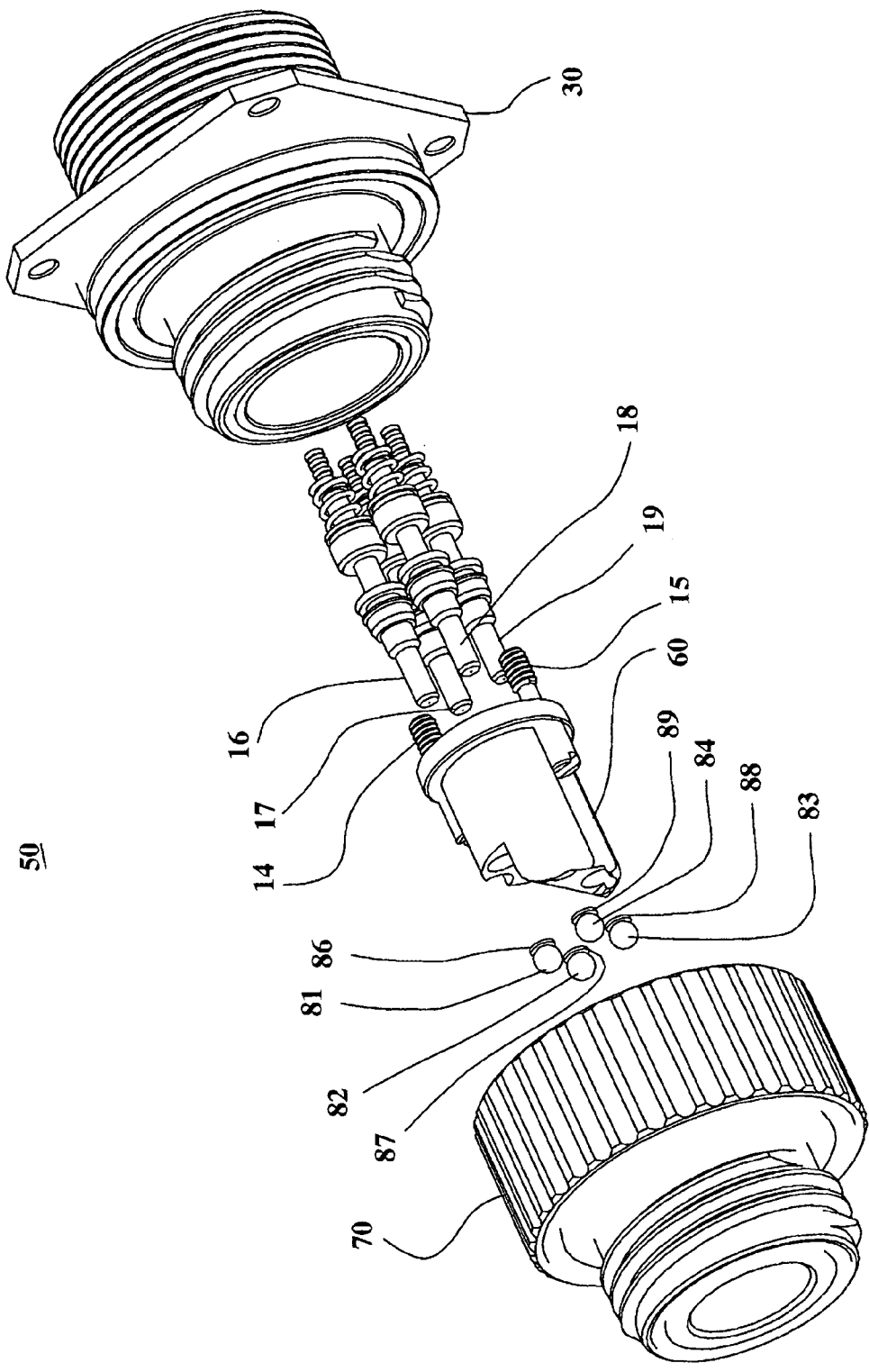
FIG. 5 is an exploded perspective view of the fiber optic bulkhead connector of FIG. 3.

Referring now to the drawings, wherein like reference numerals designate identical or corresponding parts throughout the several views, and more particularly to FIGS. 3–5 thereof, an embodiment of the present invention is a device or fiber optic bulkhead connector 50 which is displayed therein.

Figure 1:
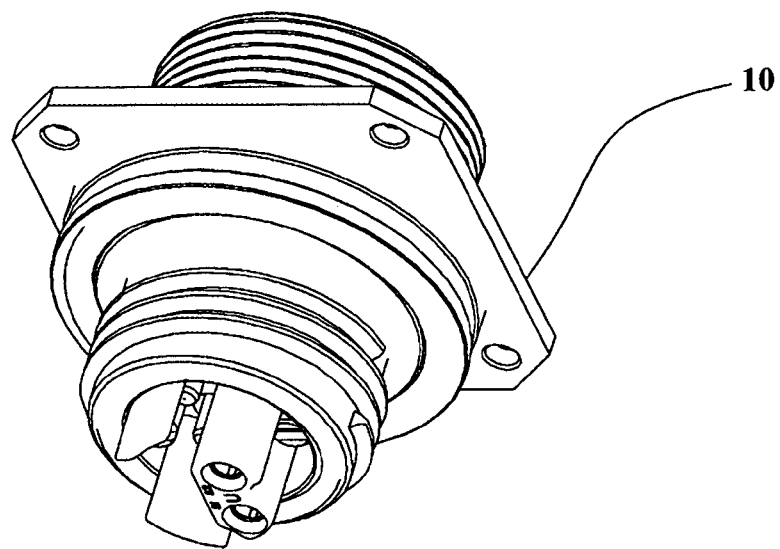
FIG. 1 is a perspective view of the prior art bulkhead connector.
Figure 2:
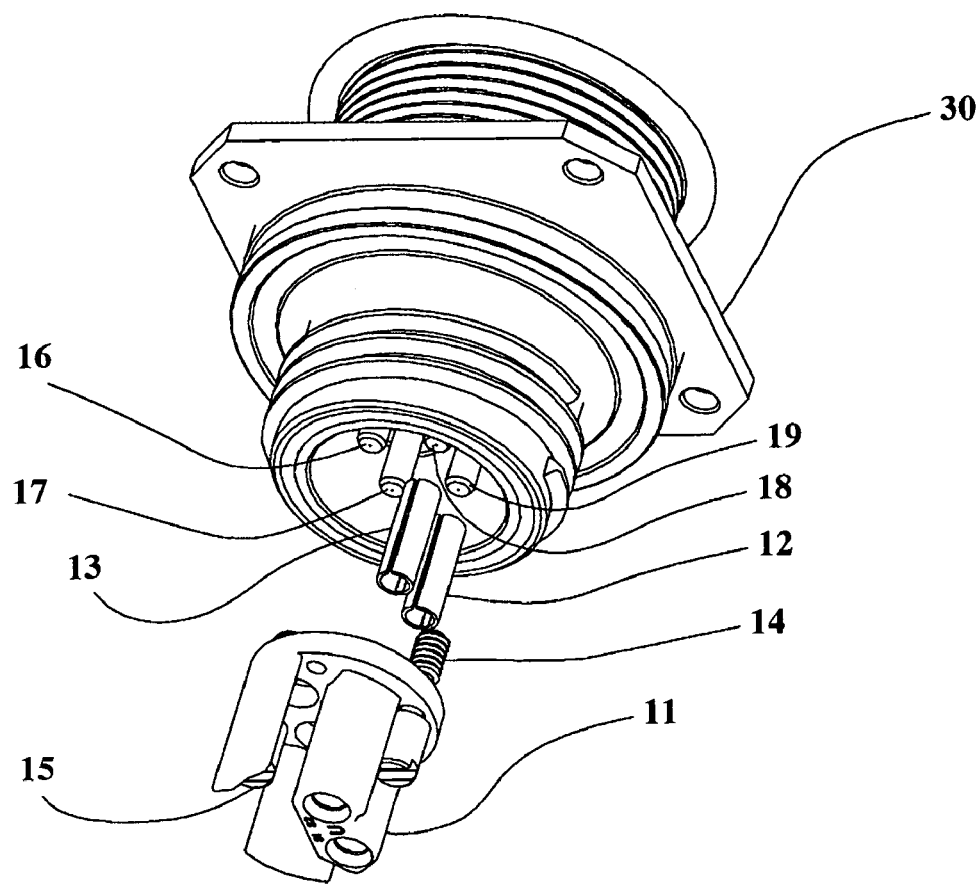
FIG. 2 is an exploded perspective view of the prior art bulkhead connector of FIG. 1.

FIG. 1 is a perspective view of the prior art fiber optic bulkhead connector 10. FIG. 2 is an exploded perspective view of the prior art fiber optic bulkhead connector 10. The fiber optic bulkhead connectors 10 of the prior art utilize a well accepted part, the bulkhead connector housing 30, as one element of the invention. However, as previously described, the prior art fiber optic bulkhead connector 10 has disadvantages. As shown in FIG. 2, the disadvantageous parts, such as the insert body or cap 11 and the alignment sleeves 12 and 13, are removed. The parts are removed by unscrewing screws 14, and 15 from the bulkhead connector housing 30 so as to be able to remove the cap 11 and the alignment sleeves 12, and 13.

FIG. 3 is an exploded perspective view of the fiber optic bulkhead connector 50 of the present invention. After the prior art parts 11, 12, and 13 have been removed, the expanded beam insert body 60 and mating plane adapter 70 are installed on the bulkhead connector housing 30. The expanded beam insert body 30 is retained adjacent to the bulkhead connector housing 30 with the screws 14, and 15. The mating plane adapter 70 is mounted on the bulkhead connector housing 30 using the existing thread form 31 of the bulkhead connector housing 30. The mating plane adapter 70 has an internal thread form that is compatible with the thread form 31 of the bulkhead connector housing 30, but the internal thread form is not shown. The external thread form 71 of the mating plane adapter 70 is substantially the same as thread form 31 of the bulkhead connector housing 30. The mating plane adapter 70 has a knurled cylindrical surface 72 for easy handling by a user in the field.

FIG. 4 is a perspective view of the assembled fiber optic bulkhead connector 50.

FIG. 5 is an exploded perspective view of the fiber optic bulkhead connector 50 where the mating plane adapter 70, ball lenses 81, 82, 83, and 84, focal length spacers 86, 87, 88, and 89, expanded beam body 60, ferrules 16, 17, 18, and 19, and bulkhead connector housing 30 are shown. The bulkhead connector housing 30 conforms to the requirements set forth in MIL-PRF-83526/17. The ferrules 16, 17, 18, and 19 conform to the requirements set forth in MIL-PRF-29504/16 (draft dated Sep. 15, 2005).

The expanded beam insert body 60 is hermaphroditic. The ball lenses 81, 82, 83, and 84, and the focal length spacers 86, 87, 88, and 89 are mounted in the expanded beam insert body 60 by way of an optical adhesive, a mechanical retainer such as a snap ring, a transparent cover, or by any other suitable mechanism or means well known in the art. The focal length spacers 86, 87, 88, and 89 are used as shims so that the focal point of each respective ball lens 81, 82, 83, and 84 is placed on the respective ferrule 16, 17, 19, and 18.

Thus, the fiber optic bulkhead connector 50 can accept a fiber optic cable having a connector that is hermaphroditic with the expanded beam insert body 60. Out in the field, if a small piece of debris (i.e., smaller than the diameter of the ball lens 81, 82, 83, and 84) is placed along the optical emission path of the optical signal, the optical signal will still be able to enter or exit the ferrules 16, 17, 18, and 19, and the ferrules of the mating connector of the fiber optic cable.

Obviously, numerous modifications and variations of the present invention are possible in light of the above teachings. It is therefore to be understood that within the scope of appended claims, the invention may be practiced otherwise than as specifically described herein.

The invention claimed is:

1. A device comprising:
   a bulkhead connector housing;
   an expanded beam insert body mounted to the bulkhead connector housing;
   a ferrule mounted in the expanded beam insert body;
   a ball lens mounted in the expanded beam insert body;
   a focal length spacer mounted in the expanded beam insert body;
   a mating plane adapter mountable on the bulkhead connector housing.

2. A device according to claim 1 wherein the bulkhead connector housing conforms to the requirements of MIL-PRF-83526/17.

3. A device according to claim 2 wherein the ferrule conforms to the requirements of MIL-PRF-29504/16.

4. A device according to claim 3 wherein the ball lens contacts the focal length spacer.

5. A device comprising:
   a bulkhead connector housing;
   an expanded beam insert body mounted to the bulkhead connector housing;
   a first ferrule mounted in the expanded beam insert body;
   a second ferrule mounted in the expanded beam insert body;
   a first ball lens mounted in the expanded beam insert body;
   a second ball lens mounted in the expanded beam insert body;
   a first focal length spacer mounted in the expanded beam insert body;
   a second focal length spacer mounted in the expanded beam insert body;
   a mating plane adapter mountable on the bulkhead connector housing.

6. A device according to claim 5 wherein the first ball lens contacts the first focal length spacer.

7. A device according to claim 6 wherein the second ball lens contacts the second focal length spacer.

8. A device according to claim 7 wherein the first ball lens is in optical communication with the first ferrule.

9. A device according to claim 8 wherein the second ball lens is in optical communication with the second ferrule.

10. A device according to claim 9, further comprising a third ball lens mounted in the expanded beam insert body.

11. A device according to claim 10, further comprising a third focal length spacer mounted in the expanded beam insert body.

12. A device according to claim 11, further comprising a third ferrule mounted in the expanded beam insert body.

13. A device according to claim 12 wherein the third ball lens contacts the third focal length spacer.

14. A device according to claim 13 wherein the third ball lens is in optical communication with the third ferrule.

15. A device according to claim 14, further comprising a fourth ball lens mounted in the expanded beam insert body.

16. A device according to claim 15, further comprising a fourth focal length spacer mounted in the expanded beam insert body.

17. A device according to claim 16, further comprising a fourth ferrule mounted in the expanded beam insert body.

18. A device according to claim 17 wherein the fourth ball lens contacts the fourth focal length spacer.

19. A device according to claim 18 wherein the fourth ball lens is in optical communication with the fourth ferrule.

20. A device according to claim 19 wherein the bulkhead connector housing conforms to the requirements of MIL-PRF-83526/17.

21. A device according to claim 20 wherein the first ferrule, the second ferrule, the third ferrule, and the fourth ferrule conform to the requirements of MIL-PRF-29504/16.

22. A fiber optic connector comprising:
   a bulkhead connector housing which conforms to the requirements of MIL-PRF-83526/17;
   an expanded beam insert body mounted to the bulkhead connector housing;
   ferrules mounted in the expanded beam insert body, and wherein the ferrules conform to the requirements of MIL-PRF-29504/16;
   ball lenses mounted in the expanded beam insert body;
   focal length spacers mounted in the expanded beam insert body;
   a mating plane adapter mountable on the bulkhead connector housing.

* * * * *